United States Patent [19]

Hsieh

[11] Patent Number: 5,330,950
[45] Date of Patent: Jul. 19, 1994

[54] MIXED ZIEGLER AND CHROMIUM CATALYST AND PROCESS FOR PREPARING A BROAD MOLECULAR WEIGHT DISTRIBUTION HDPE

[75] Inventor: John T. T. Hsieh, Warren, N.J.

[73] Assignee: Mobil Oil Corporation, Fairfax, Va.

[21] Appl. No.: 393,824

[22] Filed: Aug. 14, 1989

Related U.S. Application Data

[63] Continuation of Ser. No. 139,220, Dec. 29, 1987, abandoned.

[51] Int. Cl.$^5$ .............. C08F 4/24; C08F 10/02
[52] U.S. Cl. .................... 502/113; 526/97; 526/348.5
[58] Field of Search .......................... 502/113

[56] References Cited

U.S. PATENT DOCUMENTS

| | | | |
|---|---|---|---|
| 3,622,521 | 11/1971 | Hogan et al. | 526/352 |
| 3,647,772 | 3/1972 | Kashiwa et al. | 526/124 |
| 4,056,668 | 11/1977 | Berger et al. | 526/124 |
| 4,087,380 | 5/1978 | Hyde et al. | 526/125 |
| 4,263,422 | 4/1981 | Lowery et al. | 526/97 |
| 4,311,817 | 1/1982 | Morita et al. | 526/124 |
| 4,329,253 | 5/1982 | Goodell et al. | 526/125 |
| 4,431,572 | 2/1984 | Karayannis et al. | 526/124 |
| 4,569,975 | 2/1986 | Esneault et al. | |
| 4,657,998 | 4/1987 | Malpass . | |
| 4,863,886 | 9/1989 | Hsieh | 526/124 |

FOREIGN PATENT DOCUMENTS 2024832  1/1980  United Kingdom ............... 526/904

OTHER PUBLICATIONS

Ziegler-Natta Catalysts and Polymerizations, John Boor, Jr. (1979), p. 24.
Encyclopedia of Chemical Technology, vol. 14, pp. 631-633.

Primary Examiner—Edward J. Smith
Attorney, Agent, or Firm—Alexander J. McKillop; Malcolm D. Keen; Marina V. Schneller

[57] ABSTRACT

Ethylene polymers or copolymers having very broad molecular weight distributions in a broad range of melt-indicies are produced by using mixtures of MgO-supported Ziegler catalyst and a chromium oxide catalyst in which the usual poisoning of the catalysts does not occur.

15 Claims, No Drawings

MIXED ZIEGLER AND CHROMIUM CATALYST AND PROCESS FOR PREPARING A BROAD MOLECULAR WEIGHT DISTRIBUTION HDPE

This application is a continuation of Ser. No. 139,220 filed Dec. 29, 1987 now abandoned.

CROSS-REFERENCE TO RELATED APPLICATIONS

My copending U.S. Application Ser. No. 111,944 filed, Oct. 21, 1987, now abandoned which is incorporated herein by reference, discloses and claims chromium based catalysts which are suitable for use as one component of the mixed catalysts of this invention.

U.S. Application Ser. No. 139,213, filed Dec. 29, 1987, now U.S. Pat. No. 4,863,886 concurrently with this application disclose Ziegler catalysts which are suitable for use as the other component of the mixed catalysts of this invention.

BACKGROUND OF THE INVENTION

It is well recognized that for certain applications it is advantageous that high density ethylene polymers have a broad molecular weight distribution (MWD). For example, in blow molding of articles, such as bottles, broad MWD polymers are desirable because they exhibit better impact strength and have superior environmental stress-crack resistance (ESCR) compared to polymers with narrow molecular weight distribution.

Various expedients have been proposed to prepare ethylene polymers with broad molecular weight distribution including modifications to the catalyst system such as described in many patents, for example U.S. Pat. Nos. 4,657,998 and 4,569,975.

In accordance with this invention, novel catalysts quite different from those previously proposed are provided for preparing ethylene polymers and copolymers, particularly high density polyethylene (HDPE) with a broad molecular weight distribution. The unique character of these catalysts is reflected in the general belief that the essential components, a magnesium oxide supported Ziegler catalyst and chromium catalyst component, should not be combined because poisoning of the chromium catalyst would result.

SUMMARY OF THE INVENTION

A mixed catalyst comprising a chromium ethylene polymerization catalyst and a Ziegler ethylene polymerization catalyst gives significantly broader molecular weight distribution polymers when used in the polymerization of ethylene, to particularly high density ethylene homopolymer and high density copolymers of ethylene and higher olefins. The chromium catalyst comprises a chromium compound on an inert support and the Ziegler catalyst comprises an aluminum component and a titanium component on a magnesium oxide support in which the weight ratio of chromium catalyst to Ziegler catalyst is from 3:1 to 15:1 for maximum compatibility. Wherein the weight ratio gives a broader molecular weight distribution (MWD) than either catalyst component above.

DETAILED DESCRIPTION OF THE INVENTION

A. Preparation of the Ziegler Catalyst Component

The Ziegler catalyst component can be prepared in the manner described in my U.S. Pat. Nos. 4,167,493 and 4,288,578 which are incorporated herein by reference. My allowed U.S. Application Ser. No. 139,213 now U.S. Pat. No. 4,863,886 filed concurrently herewith, which is incorporated herein by reference, illustrates the preparation of particularly suitable Ziegler catalyst components.

In my copending application magnesium oxide is treated with an organic acid, then with the product of 0.5 to 1.5 moles of an alkanol and one mole of TiCl$_4$, and finally with an organoaluminum compound as a reducing agent.

The initial treatment of the MgO support with organic acid is conducted with a molar excess of MgO. Preferably, the ratio of organic acid to MgO is from 0.001 to 0.5, most preferably from 0.005 to 0.1.

The Organic acid is desirably an aromatic carboxylic acid, including substituted benzoic acid containing alkyl or alkoxy substitutes. Lower alkoxy substituted benzoic acid such as 2-ethoxybenzoic acid has been demonstrated to be suitable. The acid is typically dissolved in an inert organic solvent such as hexane in which the MgO is refluxed.

After drying, the acid-treated MgO support is again treated in a similar manner with the product of an alkanol having 5 to 12 carbon atoms and TiCl$_4$ in a ratio of about 0.5 to 1.5, preferably about 0.8 to 1.2, moles of acid per mole of TiCl$_4$.

After washing and drying the treated MgO based catalyst precursor is activated with an organoaluminum compound in the known manner.

Particularly suitable aluminum compounds have the formula $$R_n Al\, X_{(3-n)}$$

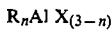

in which R is alkyl, alkenyl, alkylaryl or arylalkyl having 1 to 20 carbon atoms, X is hydrogen or halogen and n is 1, 2 or 3. Compounds in which R is alkyl of 1 to 6 carbon atoms are preferred.

B. Preparation of the Chromium Catalyst

The chromium catalyst can be prepared by the method described in U.S. Pat. No. 3,622,521, which is incorporated herein by reference.

Preferably, the chromium catalyst, comprises chromium oxide on silica support, titanated with a tetraalkyltitanate.

Preferably, the chromium catalyst is prepared as described in a copending U.S. Application in which I am a coinventor, Ser. No. 111,944 filed Oct. 22, 1987 now abandoned, incorporated herein by reference.

In general, the chromium catalyst is prepared by:
(1) drying or dehydrating the refractory oxide support material, e.g., silica at a temperature of about 100° to about 500° C., preferably about 150° to about 300° C. and most preferably at about 200° C. for at least about 14 hours (hrs), preferably at least about 16 hours, and most preferably for about 15 hours in a nitrogen atmosphere;
(2) depositing a chromium compound, e.g., chromium trioxide onto the dried support;
(3) contacting the thus-obtained catalyst intermediate with at least one tetravalent titanium compound; e.g., tetraisopropyltitanate; and
(4) purging the flammable components with nitrogen, preferably at about 325° C., and subsequently thermally activating the resulting solid, in an air atmosphere, at a temperature of at least about 800° C., preferably at least about 820° C., more preferably at about 820° to about 870° C. and most preferably at about 825° C. for at least about 10 hrs; preferably at least 14 hrs, and most preferably for about 16 hrs, to obtain an active catalyst composition.

C. Combining the Catalyst Components

The catalyst components can be combined in any suitable manner such as by physical mixing prior to introduction to the reactor, or by separate feeding to the reactor in the desired proportions. The components should be present in a weight ratio of the chromium catalyst to the Ziegler catalyst of from about 3:1 to 15:1, preferably 8:1 to 12:1 for maximum compatibility.

D. Polymerization

Ethylene can be homopolymerized or copolymerized with higher olefins using the catalysts prepared according to the present invention, by any suitable process. Such processes include polymerizations carried out in suspension, in solution or in the gas phase. Gas phase polymerization reactions are preferred, such as those conducted in stirred bed reactors and, especially, fluidized bed reactors. The molecular weight of the polymer is controlled in the known manner, by using hydrogen. With the catalysts produced according to the present invention, molecular weight may be suitably controlled with hydrogen when the polymerization is carried out at relatively low temperatures, e.g., from about 30° to 105° C. This control of molecular weight may be evidenced by a measurable positive change in melt index ($I_2$) of the polymer produced.

The molecular weight distribution (MWD) of the polymers prepared with the catalysts of this invention, as expressed by the melt flow ratio (MFR) values ($I_{21}/I_2$) varies from about 120 to about 240, preferably about 140 to about 200, for HOPE products with a density of about 0.940 to about 0.970. As recognized by those skilled in the art, such MFR values are indicative of a broad molecular weight distribution of the polymer. As is also known to those skilled in the art, such MFR values are indicative of the polymers especially suitable for blow molding applications.

The catalysts prepared according to the present invention are highly active and may have a typical activity of about 400–1000 grams of polymer per gram of catalyst per 120 psi of ethylene per hour.

The linear polyethylene polymers prepared in accordance with the present invention may be homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comohomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

A particularly desirable method for producing polyethylene polymers and copolymers according to the present invention is in a fluid bed reactor. Such a reactor and means for operating it are described by Levine et al, U.S. Pat. No. 4,011,382, and Karol et al, U.S. Pat. No. 4,302,566, the entire contents of both of which being incorporated herein by reference, and by Nowlin et al, U.S. Pat. No. 4,481,301.

This invention is illustrated by the following non-limiting examples in which all parts are by weight unless otherwise specified.

EXAMPLE 1

MgO Supported Ziegler Catalyst Preparation

A 6.8 gram sample of MgO support (Merck-Maglite D) was dried in a 100-ml Schlenk flask under nitrogen at 250° C. for 16 hours without stirring. The MgO support was then slurried in 60 ml dry hexane in a 100-ml Schlenk flask and refluxed for 2 hours with 0.26 ml 2-ethoxybenzoic acid (2-EBA) at 0.01 2-EBA/MgO molar ratio. A dilute pentanol solution was prepared by adding 11.8 ml of pre-dried 1-pentanol (0.109 mole) to 10 ml of dry hexane in another flask. To avoid a rapid isotherm, 12 ml of neat $TiCl_4$ (0.109 mole) was added dropwise to the 1-pentanol solution to form the titanium compound solution. The (1:1 pentanol/$TiCl_4$) solution was immediately added to the 2-EBA treated MgO at room temperature. The slurry was refluxed at 70° C. for 16 hours and allowed to cool.

The catalyst precursor was washed six times with 60 ml of dry hexane. The solid was re-slurried with 60ml of dry hexane, and 2.64 ml of 26 wt. % tri-n-hexylaluminum (TNHAL) solution (1.636 mmole TNHAL) was slowly added (about three minutes) to form a catalyst having a Al/Ti ratio of 0.25. The catalyst was dried for 16 hours at 70° C. under nitrogen purge, to give a free-flow dark brown powder. Elemental analysis indicated that 1.34 mmoles/g of Ti was on the finished catalyst.

EXAMPLE 2

Silica-Supported Chromium-Catalyst Preparation

Step 1 (Drying) - A chromium oxide coated silica (0.18% wt. Cr, calculated as chromium trioxide) having about 88% of its pore volume in the pore sizes of between 250 and 450 Angstroms (Crossfield SD-186) was introduced into a fluid-bed drying vessel maintained under nitrogen ($N_2$) at an ambient temperature and pressure. The temperature of the vessel was increased at the rate of 25° C./hour until it reached about 200°–210° C. The silica was dried in nitrogen atmosphere at about 200°–210° C. for 16 hrs. It was then cooled to below 100° C. in 2–4 hrs.

Step 2 (Titanation)—30.0 grams of the product of Step 1 was charged to a 50 ml flask along with 250 ml of dry hexane. 10.5 ml of tetraisopropyltitanate was added at room temperature and the resulting brown slurry heated to 60°–65° C. under a vigorous nitrogen purge until the solid was dry (about 16–24 hrs). The hexane was removed in an oil bath with the temperature set at 65° C. over the period of 16 hrs.

Step 3 (Activation)—Under good fluidization, the product of Step 2 was heated at 25° C./hr until it reached the temperature of 325° C. It was then heated at 325° C. for 2 hours in nitrogen; the nitrogen atmosphere was changed to air; the temperature was increased from 325° C. to 825° C. at 100° C./hr; and, it was heated for 16 hrs at 825° C. in dry air. The temperature was then decreased to 350° C. as fast as possible At 350° C., the air was again changed to nitrogen, and the temperature was decreased to ambient as fast as possible. The nitrogen purge was maintained for 1 hour at ambient temperature. The product was a yellow-orange catalyst which analyzed as follows:

Cr=0.18% wt.

Ti=4.0% wt.

EXAMPLE 3

Copolymerization of Ethylene and Hexene 1.05 grams of the Cr catalyst of Example 2 was mixed with 0.1 gram of the catalyst of Example 1 in a Schlenk tube. The mixed catalyst was fed into a 1-gallon slurry reactor with 2 liters of hexane. The reactor was heated to 90° C. and 5 ml of 1-hexene and 45 psia hydrogen were transferred to the reactor. Ethylene was continuously fed to the reactor to maintain 120 psia ethylene partial pressure. The polymerization was carried out at 90° C. for 50 minutes. We obtained 346 grams of resin having the following properties:

$MI_2$=0.26 ( g/10 min. )

$MI_{21}$=47.1 (g/10 min. )

MFR=183

DENSITY=0.958 (g/cc)

EXAMPLE 4

Copolymerization of Ethylene and Hexene

The polymerization procedure used was identical to Example 3 except that 0.94 gram Cr catalyst and 0.3 gram of Ziegler catalyst of Example 1 was used. The polymerization time was 70 minutes instead of 50 minutes. We obtained 549 grams of polymer with the following properties;

$MI_2$= 1.88 (g/10 min. )

$MI_{21}$=226 (g/10 min.)

MFR ($I_{21}/I_2$)=120

DENSITY:0.970 (g/cc).

EXAMPLE 5

Copolymerization of Ethylene and Hexene

A mixture of 1.03 grams of the Cr catalyst of Example 2 and 0.1 grams of Example 1 catalyst was fed into a 2.5-gallon slurry reactor using 4 liters of isobutane. The reactor was heated to 85° C. and 15 ml of 1-hexene and 45 psia of hydrogen were added. Sufficient ethylene was introduced into the reactor to provide an ethylene partial pressure in the reactor of 120 psia. The polymerization was carried out at 85° C. for 2 hours with the following properties:

$MI_2$:.031 (g/10 min. )

$MI_{21}$=5.0 ( g/min. )

MFR ( $I_{21}/I_2$)=161

DENSITY=0.952 (g/cc)

EXAMPLE 6

Copolymerization of Ethylene and Hexene

The polymerization procedure was identical to Example 5, except that 1.06 grams of Cr catalyst of Example 2 and 0.1 grams of Ziegler catalyst of Example 1 were used. The polymerization temperature was 97° C. instead of 85° C., and no hydrogen was used. The polymerization time was 75 minutes. 973 grams of polymer was obtained with the following properties:

$MI_2$=0.082 (g/10 min. )

$MI_{21}$=14.5 (g/min)

MFR ($I_{21}/I_2$)=178

DENSITY-0.955 ( g/cc )

COMPARATIVE EXAMPLE

Copolymerization of Ethylene and Hexene

The polymerization procedure was identical to Example 6, except that 1.9 grams of Cr catalyst and no Ziegler catalyst was used and the polymerization time was 1 hour instead of 75 minutes. A polymer (940) grams of polymer with the following properties was obtained:

$MI_2$=0.219 (g/10 min )

$MI_{21}$=24.5 ( g/10 min. )

MFR ($I_{21}/I_2$)=112

DENSITY:0.952 (g/cc)

I claim:

1. A catalyst system for production of ethylene polymerization products, having a density of 0.94 to 0.97 and $I_{21}/I_2$ ratio (MFR) ranging from about 140 to about 200 comprising two catalyst components
   wherein a first of said two catalyst components comprises an aluminum component and a titanium component on a magnesium oxide support; and wherein a second of said two catalyst components comprises a chromium compound on an inert support; wherein a weight ratio of said second of said two catalyst components to said first of said two catalyst components ranges from 3:1 to 15:1 and wherein the weight ratio provides said catalyst which gives a broader molecular weight distribution (MWD) than either of said two catalyst components alone.

2. The catalyst of claim 1, wherein said weight ratio ranges from 8:1 to 12:1.

3. The catalyst of claim 1, wherein said magnesium oxide support is treated with an organic acid wherein the molar ratio of the organic acid to magnesium oxide support ranges from 0.001 to 0.5.

4. The catalyst of claim 3, wherein said magnesium oxide support is subjected to a treatment with an organic acid wherein the molar ratio of the organic acid to magnesium oxide support ranges from 0.005 to 0.1

5. The catalyst of claim 5,
   wherein said first of said two catalyst components comprises an aluminum component, which is $R_3$ Al wherein R is alkyl of 1 to 6 carbon atoms and a titanium component which is a tetravalent titanium compound on said magnesium oxide support; and wherein said second of said two catalyst components comprises a chromium compound and a titanium compound.

6. The catalyst of claim 5, wherein said second of said two catalyst components comprises a chromium oxide on a silica support titanated with tetraalkyltitanate.

7. The catalyst of claim 7, wherein said organic acid is (lower alkoxy-substituted) benzoic acid.

8. The catalyst of claim 6, wherein said tetraalkyltitanate is tetraisopropyl titanate.

9. The catalyst of claim 7, wherein said tetraalkyltitanate is tetraisopropyl titanate.

10. The catalyst of claim 8, wherein said organic acid is 2-ethoxy benzoic acid.

11. The catalyst of claim 8, wherein said organic acid is 2-ethoxy benzoic acid.

12. The catalyst of claim 1, wherein the titanium component is the reaction product of an alkanol of 1 to 5 carbon atoms, and $TiCl_4$ wherein the molar ratio of the alkanol to the $TiCl_4$ is 0.5 to 1.5 moles per mole of $TiCl_4$.

13. The catalyst of claim 1, wherein said aluminum component is tri-n-hexyl aluminum.

14. The catalyst of claim 12, wherein said aluminum component is tri-n-hexyl aluminum.

15. The catalyst of claim 3, wherein said aluminum component is tri-n-hexyl aluminum.

* * * * *